US010462059B2

(12) United States Patent
Marohn et al.

(10) Patent No.: US 10,462,059 B2
(45) Date of Patent: Oct. 29, 2019

(54) HASH TABLE ENTRIES INSERTION METHOD AND APPARATUS USING VIRTUAL BUCKETS

(71) Applicant: Intel Corporation, Santa Clara, CA (US)

(72) Inventors: Byron Marohn, Beaverton, OR (US); Christian Maciocco, Portland, OR (US); Sameh Gobriel, Hillsboro, OR (US); Ren Wang, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 15/473,413

(22) Filed: Mar. 29, 2017

(65) Prior Publication Data
US 2018/0109460 A1     Apr. 19, 2018

Related U.S. Application Data

(60) Provisional application No. 62/410,284, filed on Oct. 19, 2016.

(51) Int. Cl.
*H04L 12/819* (2013.01)
*H04L 12/743* (2013.01)
(Continued)

(52) U.S. Cl.
CPC ........ *H04L 47/215* (2013.01); *H04L 45/7453* (2013.01); *H04L 45/38* (2013.01); *H04L 45/54* (2013.01)

(58) Field of Classification Search
CPC ............. G06F 12/0802; G06F 12/1018; G06F 3/0685; G06F 12/0864; G06F 3/0644;
(Continued)

(56) References Cited

U.S. PATENT DOCUMENTS 5,970,232 A   10/1999 Passint et al.
6,674,720 B1   1/2004 Passint et al.
(Continued)

FOREIGN PATENT DOCUMENTS

EP        2802110        11/2014
JP     2011-170718 A     9/2011
(Continued)

OTHER PUBLICATIONS

Final Office Action dated Mar. 8, 2018 for U.S. Appl. No. 14/582,993, 11 pages.
(Continued)

*Primary Examiner* — Awet Haile
(74) *Attorney, Agent, or Firm* — Schwabe, Williamson & Wyatt, P.C.

(57) ABSTRACT

The present disclosure describes a process and apparatus for improving insertions of entries into a hash table. A large number of smaller virtual buckets may be combined together and associated with buckets used for hash table entry lookups and/or entry insertion. On insertion of an entry, hash table entries associated with a hashed-to virtual bucket may be moved between groups of buckets associated with the virtual bucket, to better distribute entries across the available buckets to reduce the number of entries in the largest buckets and the standard deviation of the bucket sizes across the entire hash table.

25 Claims, 7 Drawing Sheets

(51) Int. Cl.
*H04L 12/721* (2013.01)
*H04L 12/741* (2013.01)

(58) Field of Classification Search
CPC ...... G06F 3/0683; G06F 12/10; G06F 9/5083; H04L 45/7453; H04L 47/215; H04W 40/00
See application file for complete search history.

(56) References Cited

U.S. PATENT DOCUMENTS

| | | |
|---|---|---|
| 6,724,721 B1 | 4/2004 | Cheriton |
| 6,785,564 B1 | 8/2004 | Quigley et al. |
| 7,224,671 B2 | 5/2007 | Lee et al. |
| 8,583,190 B1 | 11/2013 | Kopikare et al. |
| 8,854,972 B1 | 10/2014 | Li |
| 8,874,842 B1 | 10/2014 | Kimmel et al. |
| 2004/0054924 A1* | 3/2004 | Chuah .............. H04L 47/10 726/22 |
| 2004/0085953 A1 | 5/2004 | Davis |
| 2004/0100950 A1 | 5/2004 | Basu et al. |
| 2005/0097196 A1 | 5/2005 | Wronski et al. |
| 2007/0150759 A1 | 6/2007 | Srinivasan et al. |
| 2007/0195735 A1 | 8/2007 | Rosen et al. |
| 2008/0005737 A1 | 1/2008 | Saha et al. |
| 2008/0040622 A1 | 2/2008 | Duran et al. |
| 2008/0080473 A1 | 4/2008 | Thubert et al. |
| 2008/0112318 A1 | 5/2008 | Groleau et al. |
| 2009/0070566 A1 | 3/2009 | Schreiner |
| 2009/0157684 A1 | 6/2009 | Andersen et al. |
| 2010/0058027 A1 | 3/2010 | Gong et al. |
| 2010/0080272 A1 | 4/2010 | Kwa et al. |
| 2010/0111081 A1 | 5/2010 | Diab |
| 2011/0016223 A1 | 1/2011 | Iannaccone et al. |
| 2011/0110380 A1 | 5/2011 | Muller et al. |
| 2011/0191389 A1 | 8/2011 | Okamoto |
| 2011/0213992 A1* | 9/2011 | Satsangi et al. |
| 2011/0283038 A1 | 11/2011 | Takagi |
| 2012/0143877 A1 | 6/2012 | Kumar et al. |
| 2013/0007483 A1 | 1/2013 | Diefenbaugh et al. |
| 2013/0070762 A1 | 3/2013 | Adams |
| 2013/0198540 A1 | 8/2013 | Lee et al. |
| 2013/0223443 A1 | 8/2013 | Ziegler |
| 2013/0223444 A1 | 8/2013 | Liljenstolpe et al. |
| 2013/0242996 A1 | 9/2013 | Varvello et al. |
| 2014/0064092 A1 | 3/2014 | Basso et al. |
| 2014/0153571 A1 | 6/2014 | Neugebauer |
| 2014/0173166 A1 | 6/2014 | Chen et al. |
| 2014/0181548 A1 | 6/2014 | Lamb et al. |
| 2014/0195545 A1 | 7/2014 | Anand et al. |
| 2014/0241353 A1 | 8/2014 | Zhang et al. |
| 2014/0301198 A1 | 10/2014 | Louzoun et al. |
| 2014/0328180 A1 | 11/2014 | Kim et al. |
| 2015/0095540 A1 | 4/2015 | Lin et al. |
| 2015/0120687 A1 | 4/2015 | Bhattacharjee |
| 2015/0249572 A1 | 9/2015 | Mack-Crane et al. |
| 2015/0256465 A1 | 9/2015 | Mack-Crane |
| 2015/0281036 A1 | 10/2015 | Sun et al. |
| 2015/0286586 A1 | 10/2015 | Yadav |
| 2015/0288605 A1 | 10/2015 | Yan et al. |
| 2015/0288655 A1 | 10/2015 | Narasimhamurthy et al. |
| 2015/0312144 A1 | 10/2015 | Gobriel et al. |
| 2015/0312155 A1 | 10/2015 | Anand et al. |
| 2015/0319088 A1 | 11/2015 | Wenig |
| 2016/0094449 A1 | 3/2016 | Ramia et al. |
| 2016/0124864 A1 | 5/2016 | Sun et al. |
| 2016/0170929 A1 | 6/2016 | Pethe et al. |
| 2016/0187958 A1 | 6/2016 | Wang et al. |
| 2016/0210340 A1* | 7/2016 | Cai .............. G06F 17/30575 |
| 2016/0241474 A1 | 8/2016 | Wang et al. |
| 2016/0241475 A1 | 8/2016 | Wang et al. |
| 2017/0163575 A1 | 6/2017 | Wang et al. |
| 2017/0286003 A1* | 10/2017 | Sala .............. G06F 12/1018 |
| 2017/0373960 A1* | 12/2017 | Sachdev ............ H04L 43/10 |

FOREIGN PATENT DOCUMENTS

| | | |
|---|---|---|
| KR | 20120019711 | 3/2012 |
| KR | 10-2014-0060583 | 5/2014 |
| WO | WO2015-066719 A2 | 5/2015 |
| WO | WO2017/099916 | 6/2017 |

OTHER PUBLICATIONS

Wikipedia.org, "Lookup table," Wikipedia, The Free Encyclopedia, retrieved from: https://en.wikipedia.org/w/index.php?title=Lookup_table&oldid=604105487 on Apr. 17, 2017, 7 pages.

Wikipedia.org, "Bloom filter," Wikipedia, The Free Encyclopedia, retrieved from: https://en.wikipedia.org/w/index.php?title=Bloom_filter&oldid=602326401 on Apr. 17, 2017, 15 pages.

Hichem et al., "IP address lookup for Internet routers using cache routing table," IJCI International Journal of Computer Science Issues, vol. 7, Issue 4, No. 8, Jul. 2010, pp. 35-40.

Chen et al., "A Reliable Broadcast/Multicast Scheme for Multiple Mobile Ad Hoc Networks," IEICE Transactions on Communications, vol. E89-B, No. 3, Mar. 2006, pp. 867-878.

Office Action dated May 27, 2016 for U.S. Appl. No. 14/264,912, 14 pages.

Final Office Action dated Nov. 2, 2016 for U.S. Appl. No. 14/264,912, 12 pages.

Office Action dated Dec. 30, 2016 for U.S. Appl. No. 14/750,918, 20 pages.

Zhou et al., "Scaling Up Clustered Network Appliances with ScaleBricks," SIGCOMM' Aug. 17, 2015, London, United Kingdom, pp. 241-254.

Office Action dated Jun. 29, 2017 for U.S. Appl. No. 14/264,912, 5 pages.

Office Action dated Apr. 21, 2017 for U.S. Appl. No. 14/496,495, 25 pages.

Office Action dated Nov. 21, 2016 for U.S. Appl. No. 14/582,993, 9 pages.

Final Office Action dated Mar. 6, 2017 for U.S. Appl. No. 14/582,993, 15 pages.

Office Action dated Aug. 31, 2017 for U.S. Appl. No. 14/582,993, 9 pages.

Office Action dated Dec. 19, 2016 for U.S. Appl. No. 14/750,921, 5 pages.

Office Action dated Jul. 7, 2017 for U.S. Appl. No. 14/960,993, 25 pages.

International Search Report and Written Opinion dated Feb. 6, 2017 for International Application No. PCT/US2016/060783, 15 pages.

Zhou et al., "Scalable, High Performance Ethernet Forwarding with Cuckooswitch", Dec. 2013, pp. 97-108.

International Search Report and Written Opinion dated Jan. 4, 2018 for International Application No. PCT/US2017/050324, 9 pages.

International Search Report and Written Opinion dated Feb. 9, 2018 for International Application No. PCT/US2017/061145, 11 pages.

Final Office Action dated Jan. 16, 2018 for U.S. Appl. No. 14/960,993, 33 pages.

Dice, et al., "Lightweight Contention Management for Efficient Compare-and-Swap Operations", Proceedings of the 19th International Conference on Parallel Processing, 2013, 25 pages.

Herlihy, "Wait-Free Synchronization", ACM Transactions on Programming Languages and Systems, vol. 11, No. 1, Jan. 1991, pp. 124-149.

Intel, "Intel® 64 and IA-32 Architectures Software Developer Manuals", retrieved from web on Feb. 13, 2018, 7 pages.

Intel, "Intel® Data Plane Development Kit (Intel®DPDK) Overview Packet Processing on Intel® Architecture", Communications Infrastructure Division, Dec. 2012, 35 pages.

Suhane et al., "Performance Analysis of Backoff Algorithm in IEEE 802.11 Networks", International Journal of Scientific & Engineering Research, vol. 2, Issue 6, Jun. 2011, pp. 58-61.

International Preliminary Report on Patentability dated Jul. 4, 2019 for International Application No. PCT/US2017/061145, 8 pages.

\* cited by examiner

HASH TABLE ENTRIES INSERTION METHOD AND APPARATUS USING VIRTUAL BUCKETS

INCORPORATION BY REFERENCE

This application is a non-provisional application of U.S. provisional application 62/410,284 entitled "Hash Table Entries Rebalancing Method and Apparatus Using Virtual Buckets" filed Oct. 19, 2016. The Specification of U.S. provisional application 62/410,284 is hereby fully incorporated by reference.

TECHNICAL FIELD

The present disclosure relates to the fields of computing and networking. In particular, the present disclosure is related to processes and apparatuses for rebalancing hash table entries using virtual buckets.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Various computing/networking applications involve flow classifications and/or hash table lookups. For example, as the telecommunication industry transitions to software defined network (SDN) or network function virtualization (NFV) to support legacy and upcoming usage models such as 5G on standard high volume servers, or the cloud computing industry, scalable and distributed software routing/switching has become one of the key requirements of the packet processing architecture. Two level distributed hashing architecture has been developed to achieve high performance packet switching/routing using either a cluster of standard high-volume servers or a single system composed of multiple CPU cores. In such architecture, network packets are identified in part by lookup in various hash tables. Whether it is two level or one level hashing, the performance of hash table degrades as the number of elements in each hash "bucket" increases.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
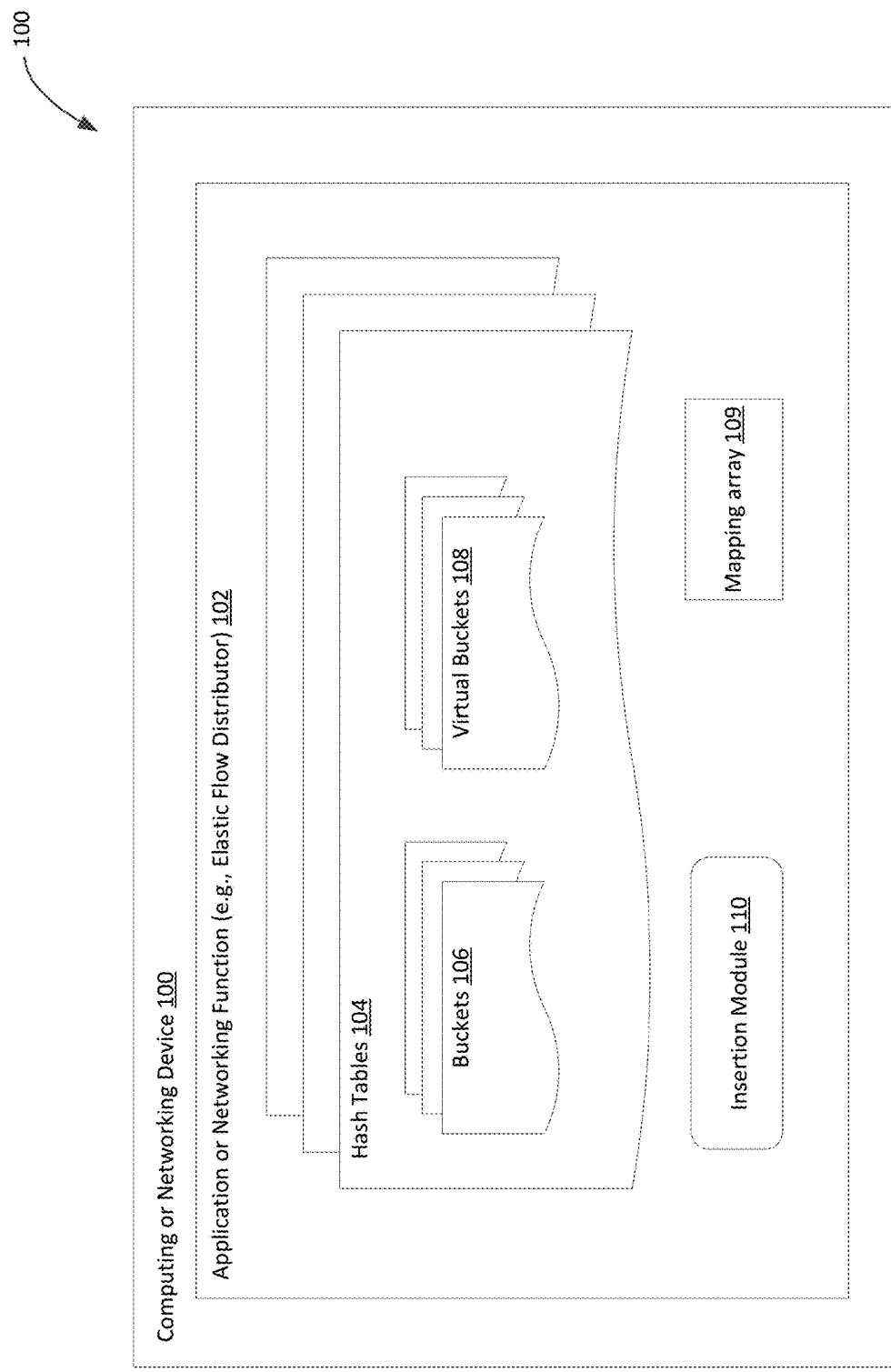
FIG. 1 illustrates an example computing/networking device having the hash table entries rebalancing technology of the present disclosure, in accordance with various embodiments.

In legacy hash table implementations, as more entries fill up each bucket of the hash table it takes longer to find an available bucket to insert a new entry into the table. This results in decreased insertion performance. In legacy implementations, when entries are inserted randomly into a fixed number of buckets (as is often the case with real workloads), the number of entries into those buckets tend to form a normal distribution with some buckets containing far more entries than the average, some almost empty, and the rest clustered around the average.

This disclosure addresses these problems by providing a mechanism by which the entries in the buckets can be rebalanced at insertion time by adding only O(1) operations. This may have the effect of transferring entries from "more full" to "less full" buckets, reducing the maximum number of entries in any one bucket. This may significantly improve performance, particularly when the hash table is highly sensitive to bucket size.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

The term "module" in general, "insertion module" in particular, may refer to, be part of, or include an Application Specific Integrated Circuit (ASIC), an electronic circuit, a combinatorial circuit, such as field programmable gate array (FPGA) programmed with the implementation logic, a processor (shared, dedicated, or group) and/or memory (shared, dedicated, or group) that execute one or more software or firmware programs with implementation logic, and/or other suitable components that provide the described functionality with references to FIGS. 1-5 below.

The term "computer-readable storage media" may refer to, be a part of, or otherwise include media on which data, including instructions of a module (e.g., the insertion module described below) that may be executed, may reside. Computer-readable storage media may be either transitory, or non-transitory.

Various operations are described as multiple discrete operations in turn, in a manner that is most helpful in understanding the claimed subject matter. However, the order of description should not be construed as to imply that these operations are necessarily order dependent.

To improve hash table performance, a large number of smaller virtual buckets may be combined together and associated with buckets used for hash table entry lookups and/or entry insertion. In this way, entries may be moved between groups of buckets at entry insertion time while substantially maintaining the performance of the underlying hash table.

For example, a hash table may be sized to hold $2^{21}$ entries (a little over 2 million). The table may be made up of $2^{16}$ (65,536) buckets that may each store $2^5$ (32) items. In addition, $2^{20}$ virtual buckets may be used, with $2^4$ (16) virtual buckets associated for each real bucket.

Thus, when randomly inserting entries each virtual bucket may have on average 2 entries, with some being larger and smaller again following a statistical normal distribution. As (non-virtual) buckets start to get too full, some virtual buckets may be subtracted from a too-full bucket and added to another bucket that is less full to balance the number of entries per bucket. This is in contrast to legacy hash table implementations that do not use virtual buckets, for example where an entry may be hashed and then 16 bits of the hash may be used to address one of $2^{16}$ buckets. Statistically, if random keys are inserted in this fashion, it is statistically likely that 30% of 2 million may be inserted before one of those buckets exceeds 32 items and the insert fails.

In embodiments, implementation of the systems and processes herein will better distribute entries across the available buckets and reduce the number of entries in the largest buckets and the standard deviation of the bucket sizes across the entire hash table.

FIG. 1 illustrates an example computing/networking device having the hash table entries rebalancing technology of the present disclosure, in accordance with various embodiments. A computing/networking device 100 may include an application or networking function 102. In embodiments, this may include an elastic flow distributor (EFD) of an SDN/NFD. In embodiments, the application or networking function 102 may include a number of hash tables 104. In embodiments, the hash tables 104 may include an array of M buckets 106, and virtual buckets 108. Additionally, the application or networking function 102 may further include a mapping array 109, and an insertion module 110 associated with the hash table 104 for inserting and rebalancing the hash table 104. An insertion module 110 may also include a hash function. The insertion module 110 may take an entry as input, compute deterministically the virtual bucket index where that entry may be stored, and adjust the distribution of virtual buckets among buckets to balance the number of entries stored in the buckets.

In embodiments, buckets 106 may contain an array of entries, which may also be referred to as an array of keys. In embodiments, the array associated with the buckets 106 may contain a fixed number of entries (N). In embodiments, an entry may include a network packet, an identification for a network packet, or data associated with the network packet. In embodiments, an entry may be any other item information that may wish to be stored and/or retrieved from a hash table. In embodiments, each of the buckets 106 may include a counter indicating the number of keys, or entries, that are stored in that bucket.

In embodiments, one or more virtual buckets 108 may be mapped to one or more of the buckets 106, which may also be referred to as a group of buckets. Virtual buckets 108 may contain a choice that may indicate to which group of buckets 106 a particular virtual bucket may be associated. In embodiments, the mapping array 109 may be an array, or other data structure, that identifies the choice of each virtual bucket and maps the relationship between virtual buckets 108 and groups of buckets 106.

In embodiments, computing or networking device 100 may be any one of such devices known in the art, e.g., servers, routers, switches, gateways, and so forth. In particular, in embodiments, computing or networking device 100 may be one of a plurality of networking devices implementing the modular forwarding table scalability technology of U.S. patent application Ser. No. 14/750,918, filed on Jun. 25, 2015, entitled "TECHNOLOGIES FOR MODULAR FORWARDING TABLE SCALABILITY," which specification is hereby fully incorporated by reference.

Figure 2:
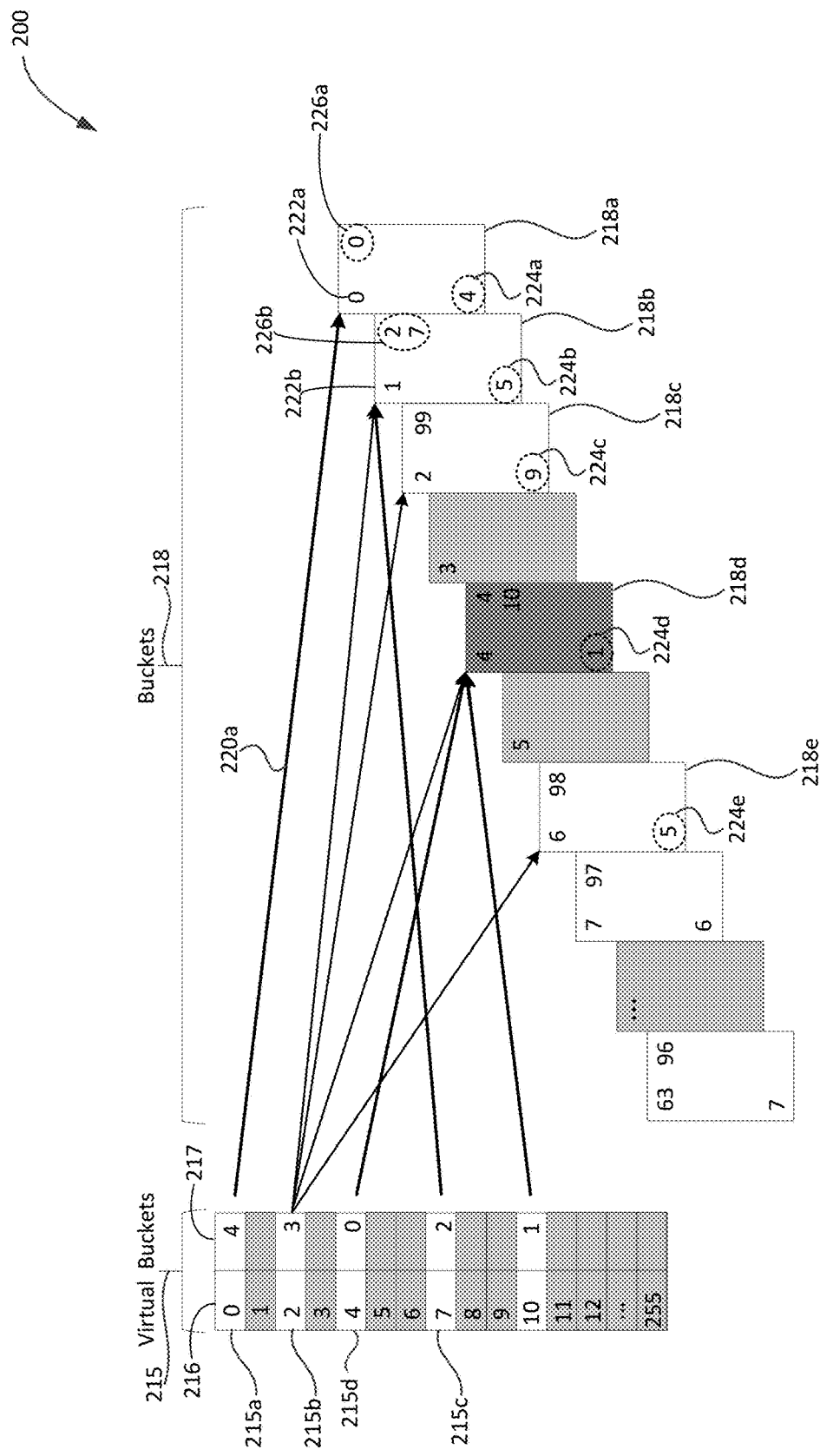
FIGS. 2-4 illustrate an example implementation of the hash table entries rebalancing mechanism of the present disclosure, according to some embodiments.
Figure 3:
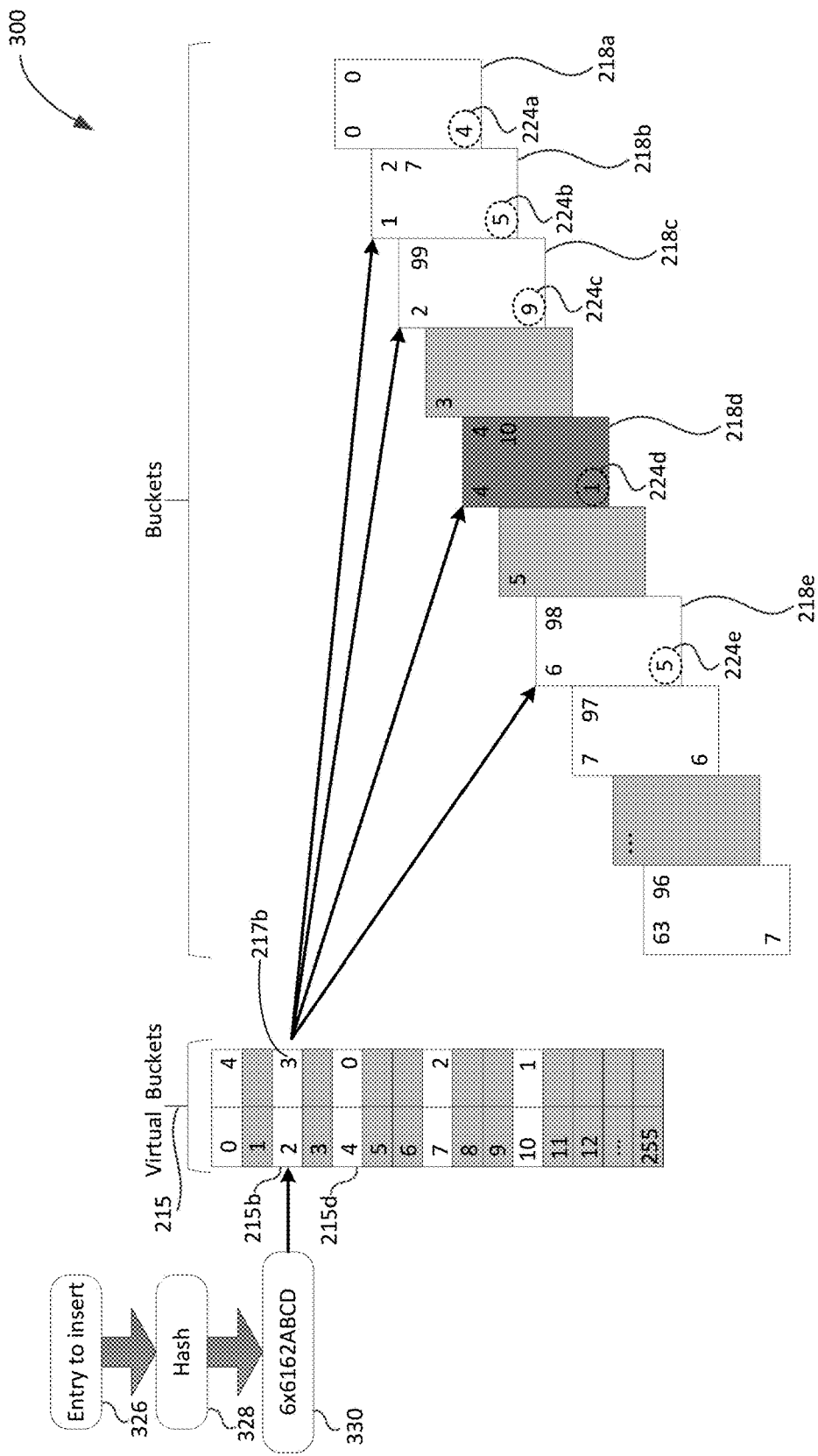
Figure 4:
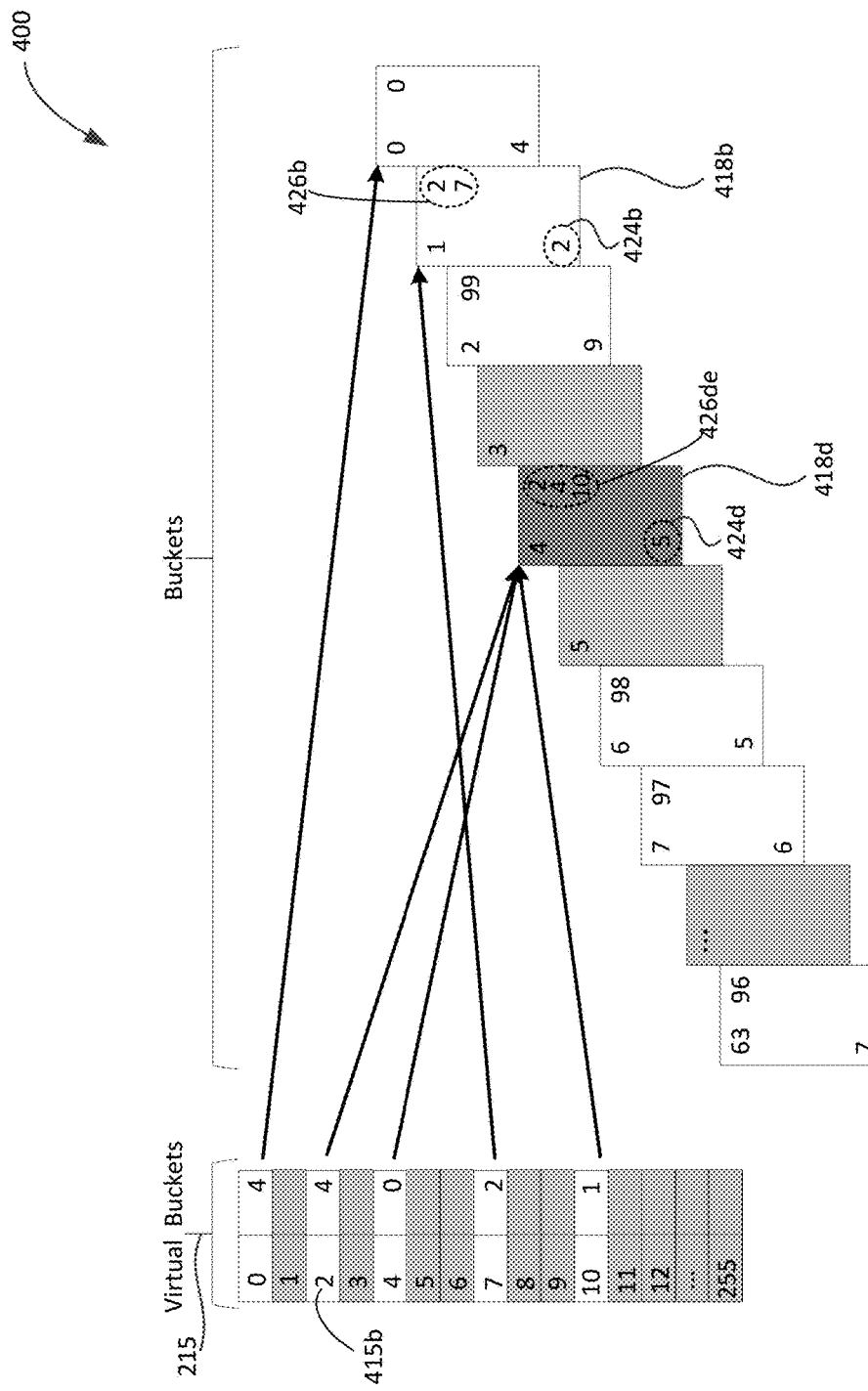

FIGS. 2-4 illustrate an example implementation of the hash table entries rebalancing mechanism of the present disclosure, according to some embodiments.

FIG. 2 illustrates an example implementation of a hash table that uses 256 (0-255) virtual buckets 215 each having a virtual bucket identifier 216 and a number of entries (keys) 217 associated with the virtual bucket. In embodiments, a hash function applied to an entry may produce an identifier 216 for a virtual bucket (e.g., 215a) to which that entry may be assigned. In embodiments, a virtual bucket may have no entries (e.g., 215d) or multiple entries (e.g., 215a or 215b), as reflected by the number 217 for the virtual bucket.

In the example, there are 64 (0-63) buckets 218. Each respective virtual bucket 215a, 215b and so forth may have four choices for each of the 64 buckets with which it may be associated, as may be indicated by the multiple arrows shown. In embodiments, there may be a different number of choices for each of the respective virtual buckets 215. A mapping array, such as mapping array 109 of FIG. 1, may be used to identify the buckets associated with each virtual bucket. In embodiments, a function (interpolation) may be used to identify the buckets associated with each virtual bucket. This may include, for example, using an offset and multiplication based on an initial number, using a fixed pseudorandom shuffle array, or some other suitable algorithm.

In the example implementation, a bucket identifier may be indicated in the upper left corner, for example, bucket "0" 222a and bucket "1" 222b. For each virtual bucket 215 there may be a group of buckets 218 to which a virtual bucket may be associated. This information may be recorded in a mapping array as discussed above. This example implementation includes, for virtual bucket "0" 215a a mapping to bucket "0" 218a. For virtual bucket "2" 215b a mapping to buckets "1" 218b, "2" 218c, "4" 218d, and "6" 218e. Consequently, bucket "1" 218b is associated with virtual buckets "2" 215b and "7" 215c. The total number of entries associated with a bucket 218a may be indicated in the lower left corner of the bucket, for example the number "4" 224a. This number for a particular bucket may be the sum of each of the entries associated with each of the virtual buckets 215 associated with the bucket. For example, "5" 224b is the sum of the number of entries of virtual bucket 2 (3) and virtual bucket 7 (2).

FIG. 3 illustrates an example implementation of an insertion of an entry into the hash table. For example, an entry to insert 326 may have part of its data used as input to a hash function 328 that may result in a hash value 330. In this example, the hash value 330 corresponds to virtual bucket "2" 215b that already has 3 entries associated with it 217b. Virtual bucket "2" 215b is associated with four buckets 218b, 218c, 218d, 218e.

The four buckets 218b, 218c, 218d, 218e associated with virtual bucket "2" 215b are examined to determine whether rebalancing may be needed. The current entry counts 224b, 224c, 224d, 224e for each of the four buckets 218b, 218c, 218d, 218e are compared to determine which bucket has the lowest number of entries. In this example, bucket "4" 218d has an entry count of "1" 224d, which is lower than "5" 224b, "9" 224c or "5" 224e. Therefore, rebalancing of the hash table may proceed by moving the entries associated with virtual bucket "2" 215b from bucket "1" 218b to bucket "4" 218d. After rebalancing, the entry 326 may be inserted into bucket "4" 218d. In embodiments, the insertion may happen first, for example into bucket "1" 218b, and then rebalancing performed after insertion.

FIG. 4 illustrates an example implementation of rebalancing based on an insertion of an entry into the hash table. The four entries of virtual bucket "2" 415b, which may be similar to 215b of FIG. 3, but now incremented by one to account for the inserted entry, is associated with bucket "1" 418b, which may be similar to bucket "1" 218b of FIG. 3, have been moved to bucket "4" 418d, which may be similar to bucket "4" 218d of FIG. 3. As a result, the bucket "1" count 424b, which may be similar to 224b of FIG. 3, is now 2 (5−3), and the bucket "4" count 424d, which may be similar to 224d of FIG. 3, is now 5 (the original 1 entry plus the 3 entries moved plus the 1 new entry inserted).

Figure 5:
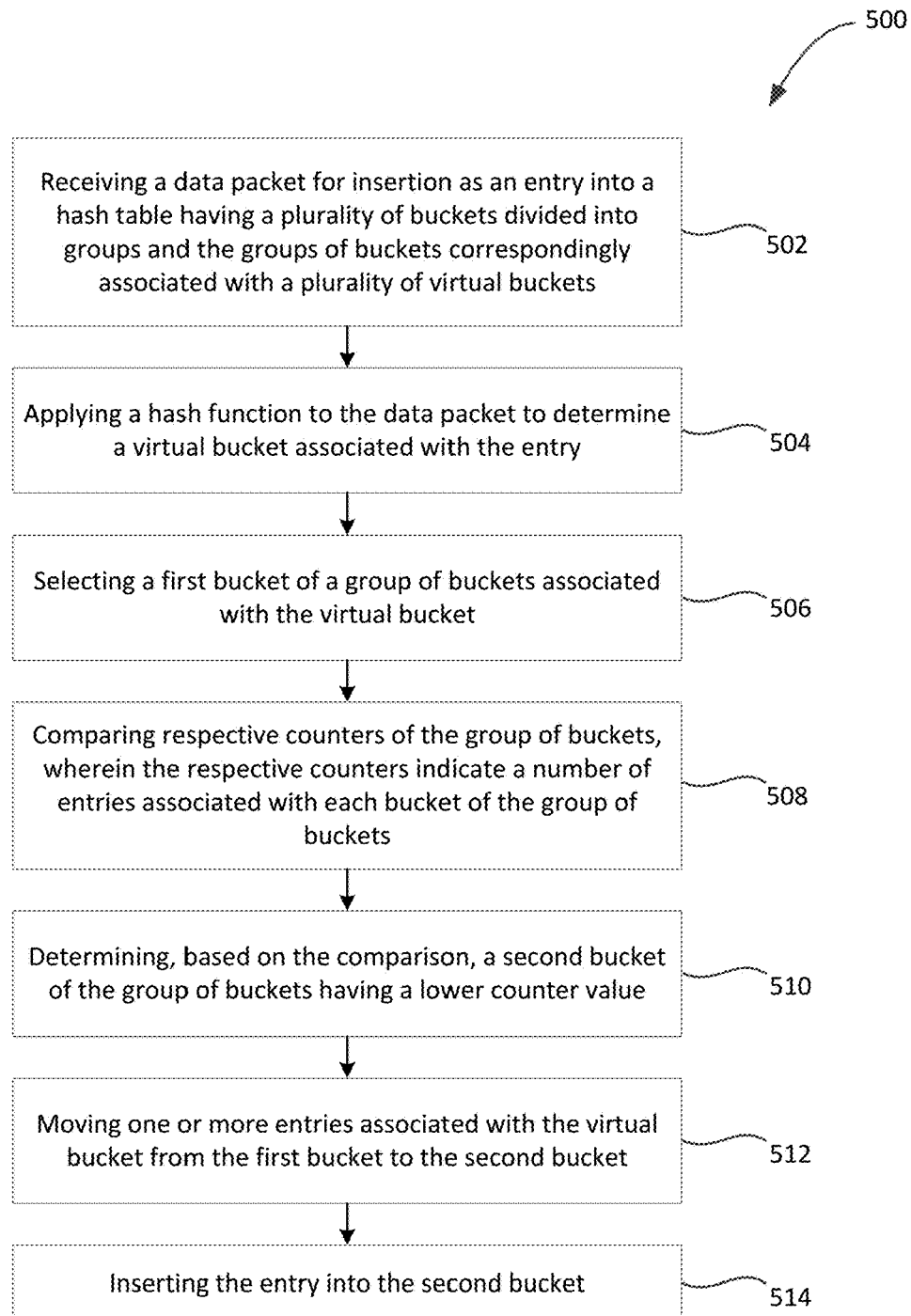
FIG. 5 illustrates an example process for rebalancing entries in a hash table using virtual buckets, in accordance with various embodiments.

FIG. 5 illustrates an example process for rebalancing entries in a hash table using virtual buckets, in accordance with various embodiments. The process 500 may be performed, for example, by the device 100 of FIG. 1 or the system 600 (e.g., computing device) configured to implement the insertion module 650, similar to insertion module 110 and/or the hashing function module 852, similar to hashing function 328, described in reference to FIGS. 1-5.

The process 500 may begin at block 502, and may include receiving a data packet for insertion as an entry into a hash table having a plurality of buckets divided into groups and the groups of buckets correspondingly associated with the plurality of virtual buckets. In embodiments, this may include a plurality of buckets such as buckets 218 of FIG. 2. In embodiments, the buckets may include a number of entries, for example entries of data packets. There may be a fixed number of buckets (M). The buckets may include a fixed number of slots for entries (N). The plurality of virtual buckets, such as virtual buckets 215 of FIG. 2, may each mapped to a group of one or more buckets. In embodiments, because the number of virtual buckets 215 outnumbers the number M of buckets 218, a hashing function, for example as implemented by the hashing function module 652 of FIG. 6 or 328 of FIG. 3, may distribute hashed entries over the virtual buckets with smaller maximum bucket size than may be achieved if the hashing function mapped entries directly into the limited number of buckets. In embodiments, an entry may include all or a portion of the data packet, or may be some other data item that is to be stored in a hash table and later retrieved.

At block 504, the process 500 may include applying a hash function to the data packet to determine a virtual bucket associated with the entry. In embodiments, the hash function may be implemented by the hash function module 652 of FIG. 6 or 328 of FIG. 3. In embodiments, the hash function may be one of any suitable hash functions, where the results of the hash function are to identify a virtual bucket to which the entry may be associated.

At block 506, the process 500 may include selecting a first bucket of a group of buckets associated with the virtual bucket. In embodiments, this may include the functionality described with respect to FIG. 3 or the insertion module 650 of FIG. 6. In embodiments, there may be a default bucket within the group of buckets for a virtual bucket identified as the first bucket. For example, this may be the bucket having the lowest identification number, such as bucket 218b of FIG. 3. In embodiments, some other suitable algorithm may be used to select the first bucket. In embodiments, a mapping array, such as mapping array 109 of FIG. 1, may be used to identify the virtual bucket and to identify one or more buckets, or a group of buckets, that are associated with the virtual bucket. In addition, the mapping array 109 may be used to determine the default bucket or first bucket associated with the virtual bucket. In embodiments, the computational complexity of the actions of this block may involve O(1) additional time for the indirect action of hashing to a virtual bucket in order to determine a bucket.

At block 508, the process 500 may include comparing respective counters of the group of buckets, wherein the respective counters indicate a number of entries associated with each bucket of the group of buckets. In embodiments, the counters may be similar to a counter 224a associated with bucket 218a of FIG. 2. In embodiments, the counter for a bucket may count entries associated with multiple virtual buckets that are associated with the bucket.

At block 510, the process 500 may include determining, based on the comparison, a second bucket of the group of buckets having a lower counter value. In embodiments, the second bucket of the group of buckets may correspond to bucket "4" 218d of FIG. 2, having a counter value of 1 224d. In embodiments, the computational complexity of the actions of blocks 508 and/or 510 may involve O(1) additional time to scan through groups of buckets to select a second bucket.

At block 512, the process 500 may include moving one or more entries associated with the virtual bucket from the first bucket to the second bucket. In embodiments, the result of this move may be seen by the two entries associated with virtual bucket "2" 415a moved from bucket "1" 418b to bucket "4" 418d. In embodiments, the entries associated with other virtual buckets that are associated with bucket "1" 418b are not moved. In embodiments, all of the entries associated with the virtual bucket "2" 415a may be moved to the second bucket "4" 418d. In embodiments, the counts associated with each bucket may be updated accordingly. In embodiments, the computational complexity of the actions of this block may involve O(1) additional time for moving entries from the first to the second bucket.

At block 514, the process 500 may include inserting the entry into the second bucket. In embodiments, the result of this insertion may be seen by incrementing the entry count of the counter 424d associated with bucket "4" 418d, as well as incrementing the element count of virtual bucket "2" 417a from 3 to 4 as shown in FIG. 4. In embodiments, the computational complexity of the actions of this block may involve O(1) additional time for updating counters.

It should be understood that the actions described in reference to process 500 may not necessarily occur in the described sequence. In addition, some actions may be added or omitted.

Figure 6:
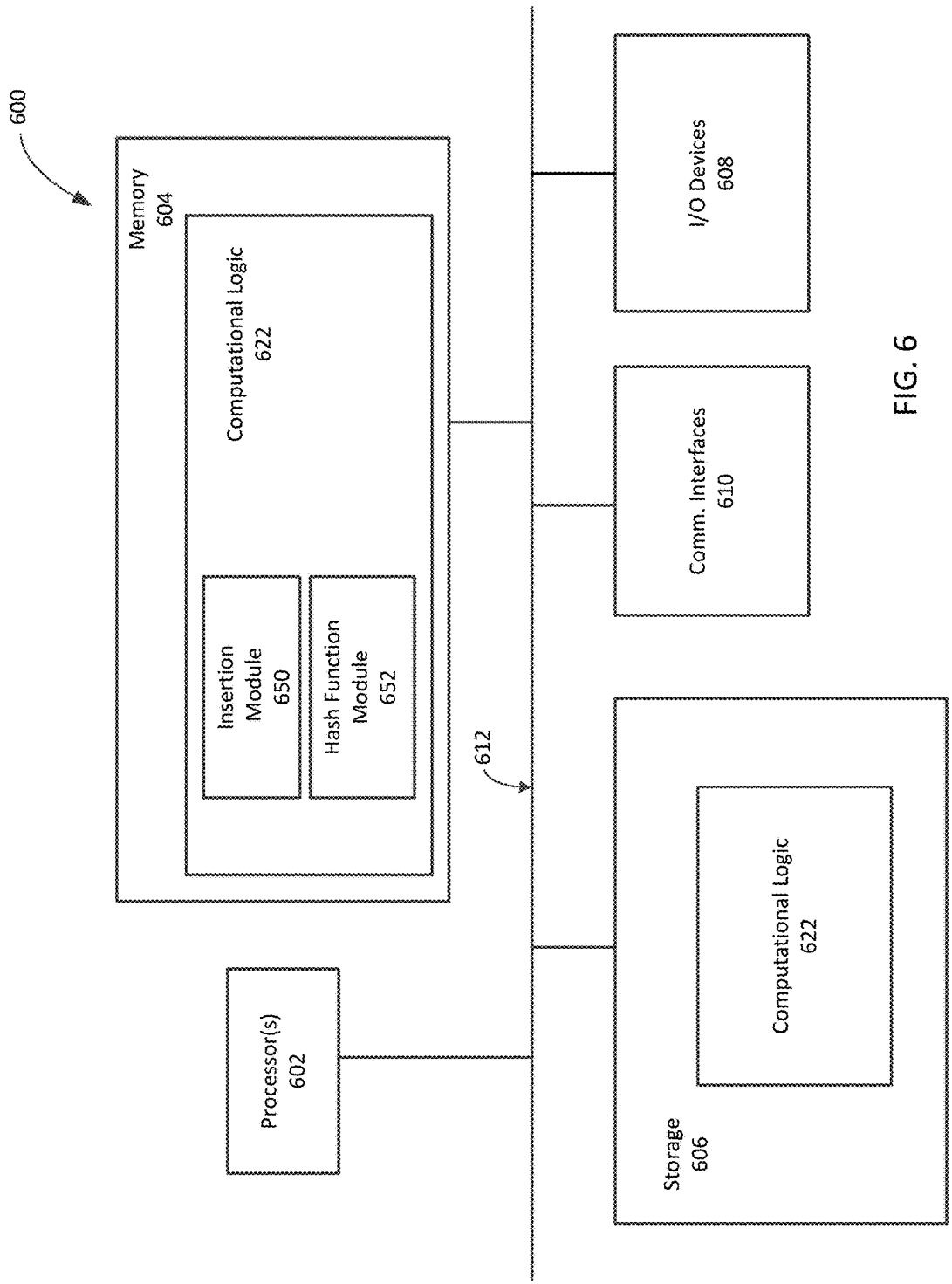
FIG. 6 illustrates a block diagram of an example architecture of a computing/networking device suitable for use to practice the present disclosure, in accordance with various embodiments.

FIG. 6 illustrates a block diagram of an example architecture of a computing/networking device suitable for use to practice the present disclosure, in accordance with various embodiments. As shown, computing device 600 may include one or more processors 602, each having one or more processor cores, and system memory 604. The processor 602 may include any type of unicore or multi-core processors. Each processor core may include a central processing unit (CPU), and one or more level of caches. The processor 602 may be implemented as an integrated circuit. The computing device 600 may include mass storage devices 606 (such as diskette, hard drive, volatile memory (e.g., dynamic random access memory (DRAM)), compact disc read only memory (CD-ROM), digital versatile disk (DVD) and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 600 may further include input/output (I/O) devices 608 such as a display, keyboard, cursor control, remote control, gaming controller, image capture device, one or more three-dimensional cameras used to capture images, and so forth, and communication interfaces 610 (such as network interface cards, modems, infrared receivers, radio receivers (e.g., Bluetooth), and so forth). I/O devices 608 may be suitable for communicative connections with user devices or other system devices. In some embodiments, I/O devices 608 when used as user or system devices may include a device necessary for implementing the functionalities of receiving a data packet for insertion as an entry as described in reference to FIG. 5.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations and functionalities associated with FIG. 1 and/or FIG. 5, generally shown as computational logic 622. Computational logic 622 may be implemented by assembler instructions supported by processor(s) 602 or high-level languages that may be compiled into such instructions.

In embodiments, the Computational Logic 622 may contain an insertion module 650, which may perform one or more of the functions associated with FIGS. 1-5. Computational Logic 822 may contain a hash function module 652, which may perform one or more of the hash functions associated with FIG. 1-5.

The permanent copy of the programming instructions may be placed into mass storage devices 606 in the factory, or in the field, though, for example, a distribution medium (not shown), such as a compact disc (CD), or through communication interfaces 610 (from a distribution server (not shown)).

In embodiment, computing device 600 may be a wearable device, a smartphone, a computing tablet, a laptop computer, a desktop computer, a server, a set-top box, a game console, a router, a switch, a gateway, or other networking equipment.

Figure 7:
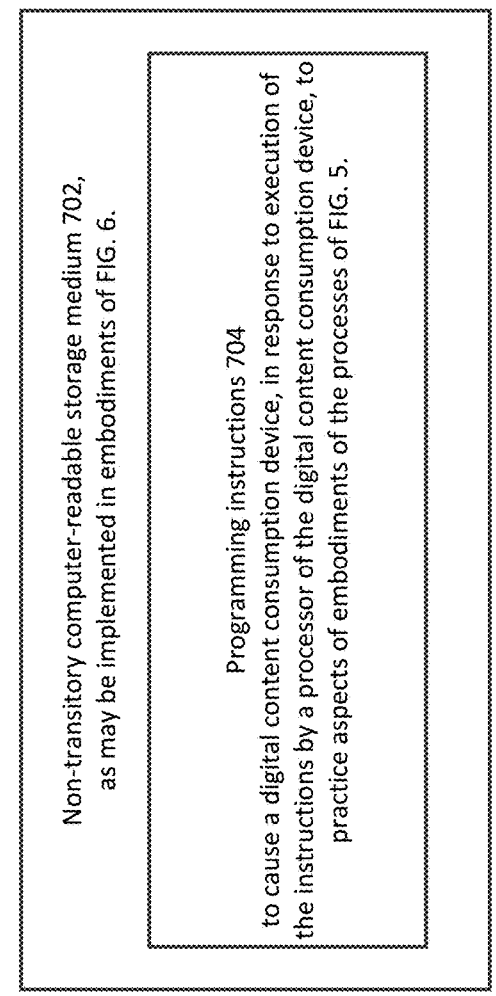
FIG. 7 illustrates an example computer-readable storage medium with instructions configured to enable a computing/networking device to practice aspects of the present disclosure, in accordance with various embodiments.

FIG. 7 illustrates an example computer-readable storage medium with instructions configured to enable a computing/networking device to practice aspects of the present disclosure, in accordance with various embodiments. As illustrated, non-transitory computer-readable storage medium 702 may include a number of programming instructions 704 (e.g., including insertion module 650 and hashing function module 652). Programming instructions 704 may be configured to enable a device, e.g., computing device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 704 may be encoded in transitory computer-readable signals.

Referring also to FIG. 6, for some embodiments, processor 602 may be packaged together with a computer-readable storage medium having programming instructions 704 configured to practice all or selected aspects of the hash table insertion and rebalancing related operations earlier described. For one embodiment, processor 602 may be packaged together with a computer-readable storage medium having programming instructions 704 to form a System in Package (SiP). For one embodiment, processor 602 may be integrated on the same die with a computer-readable storage medium having programming instructions 704. For one embodiment, processor 602 may be packaged together with a computer-readable storage medium having programming instructions 704 to form a System on Chip (SoC).

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be an apparatus for computing, comprising: one or more computer processors; a storage device coupled to the one or more computer processors; an insertion module communicatively coupled to the one or more processors, to manage insertion of entries into a hash table residing on the storage device, wherein the hash table has a plurality of buckets divided into groups and the groups of buckets are correspondingly associated with a plurality of virtual buckets; and wherein the insertion module is to: receive a data packet for insertion as an entry into the hash table; apply a hash function to the data packet to determine a virtual bucket associated with the entry; select a first bucket of the group of buckets associated with the virtual bucket; compare respective counters of the group of buckets, wherein the respective counters indicate a number of entries associated with each bucket of the group of buckets; determine, based on the comparison, a second bucket of the group of buckets having a lower counter value; move one or more entries associated with the virtual bucket from the first bucket to the second bucket; and insert the entry into the second bucket.

Example 2 may include the apparatus of example 1, wherein an entry includes a key, a value, and a virtual bucket identifier.

Example 3 may include the apparatus of example 1, wherein move one or more entries associated with the virtual bucket from the first bucket to the second bucket further includes: determine a number of entries to be moved; decrement a counter of the first bucket by the number of entries to be moved; increment a counter of the second bucket by the number of entries to be moved plus 1.

Example 4 may include the apparatus of any examples 1-3, wherein select the first bucket further includes selected the first bucket based upon entries in a mapping array.

Example 5 may include the apparatus of any examples 1-3, wherein the groups of buckets correspondingly associated with the plurality of virtual buckets are identified in a mapping array.

Example 6 may include the apparatus of example 5, wherein the mapping array is on the storage device.

Example 7 may include the apparatus of any one of examples 1-3, wherein a data packet includes a network packet address.

Example 8 may include the apparatus of any one of examples 1-3, wherein to insert the entry comprises to manage a standard deviation of a plurality of counters of a respective plurality of buckets.

Example 9 may include the apparatus of any one of examples 1-3, wherein the plurality of buckets is a fixed number.

Example 10 may include the apparatus of any one of examples 1-3, wherein the number of entries in a bucket is limited to a fixed number.

Example 11 may include the apparatus of any one of examples 1-3, wherein to insert the entry is to be complete in O(1) operations.

Example 12 may include the apparatus of any one of examples 1-3, wherein to insert an entry comprises to manage the number of entries respectively in the plurality of buckets.

Example 13 may be a method for computing, comprising: receiving, by a computing system, a data packet for insertion as an entry into a hash table having a plurality of buckets divided into groups and the groups of buckets correspondingly associated with a plurality of virtual buckets; applying, by the computing system, a hash function to the data packet to determine a virtual bucket associated with the entry; selecting, by the computing system, a first bucket of a group of buckets associated with the virtual bucket; comparing, by the computing system, respective counters of the group of buckets, wherein the respective counters indicate a number of entries associated with each bucket of the group of buckets; determining, by the computing system, based on the comparison, a second bucket of the group of buckets having a lower counter value; moving, by the computing system, one or more entries associated with the virtual bucket from the first bucket to the second bucket; and inserting, by the computing system, the entry into the second bucket.

Example 14 may include the method of example 13, wherein moving one or more entries associated with the virtual bucket from the first bucket to the second bucket further includes: determining, by the computing system, a number of entries to be moved; determining, by the computing system, a counter of the first bucket by the number of entries to be moved; incrementing, by the computing system, a counter of the second bucket by the number of entries to be moved plus 1.

Example 15 may include the method of any one of examples 13-14, wherein selecting the first bucket further includes selecting the first bucket based upon entries in a mapping array.

Example 16 may include the method of any one of examples 13-14, wherein the groups of buckets correspondingly associated with the plurality of virtual buckets are identified in a mapping array.

Example 17 may include the method of example 16, wherein the mapping array is on a storage device.

Example 18 may include the method of any one of examples 13-14, wherein a data packet includes a network packet address.

Example 19 may include the method of any one of examples 13-14, wherein inserting the entry comprises managing, by the computing system, a standard deviation of a plurality of counters of a respective plurality of buckets.

Example 20 may include the method of any one of examples 13-14, wherein the plurality of buckets is a fixed number.

Example 21 may include the method of any one of examples 13-14, wherein the number of entries in a bucket is limited to a fixed number.

Example 22 may include the method of any one of examples 13-14, wherein inserting the entry is to be complete in O(1) operations.

Example 23 may include the method of any one of examples 13-14, wherein inserting the entry comprises managing, by the computing system, the number of entries respectively in the plurality of buckets.

Example 24 may be one or more computer-readable media comprising instructions that cause a computing device, in response to execution of the instructions by the computing device, to: receive, by the computing device, a data packet for insertion as an entry into a hash table having a plurality of buckets divided into groups and the groups of buckets correspondingly associated with a plurality of virtual buckets; apply, by the computing device, a hash function to the data packet to determine a virtual bucket associated with the entry; select, by the computing device, a first bucket of a group of buckets associated with the virtual bucket; compare, by the computing device, respective counters of the group of buckets, wherein the respective counters indicate a number of entries associated with each bucket of the group of buckets; determine, by the computing device, based on the comparison, a second bucket of the group of buckets having a lower counter value; move, by the computing device, one or more entries associated with the virtual bucket from the first bucket to the second bucket; and insert, by the computing device, the entry into the second bucket.

Example 25 may include the one or more computer-readable media of example 24, wherein move one or more entries associated with the virtual bucket from the first bucket to the second bucket includes: determine, by the computing device, a number of entries to be moved; determine, by the computing device, a counter of the first bucket by the number of entries to be moved; increment, by the computing device, a counter of the second bucket by the number of entries to be moved plus 1.

Example 26 may include the one or more computer-readable media of any one of examples 24-25, wherein select the first bucket further includes select the first bucket based upon entries in a mapping array.

Example 27 may include the one or more computer-readable media of any one of examples 24-25, wherein the groups of buckets correspondingly associated with the plurality of virtual buckets are identified in a mapping array.

Example 28 may include the one or more computer-readable media of claim 27, wherein the mapping array is on a storage device.

Example 29 may include the one or more computer-readable media of any one of examples 24-25, wherein a data packet includes a network packet address.

Example 30 may include the one or more computer-readable media of any one of examples 24-25, wherein insert the entry comprises manage a standard deviation of a plurality of counters of a respective plurality of buckets.

Example 31 may include the one or more computer-readable media of any one of examples 24-25, wherein the plurality of buckets is a fixed number.

Example 32 may include the one or more computer-readable media of any one of examples 24-25, wherein the number of entries in a bucket is limited to a fixed number.

Example 33 may include the one or more computer-readable media of any one of examples 24-25, wherein insert the entry is to be complete in O(1) operations.

Example 34 may include the one or more computer-readable media of any one of examples 24-25, wherein insert the entry comprises manage the number of entries respectively in the plurality of buckets.

Example 35 may be an apparatus for computing, comprising: means for receiving a data packet for insertion as an entry into a hash table having a plurality of buckets divided into groups and the groups of buckets correspondingly associated with a plurality of virtual buckets; means for applying a hash function to the data packet to determine a virtual bucket associated with the entry; means for selecting a first bucket of a group of buckets associated with the virtual bucket; means for comparing respective counters of the group of buckets, wherein the respective counters indicate a number of entries associated with each bucket of the group of buckets; means for determining, based on the comparison, a second bucket of the group of buckets having a lower counter value; means for moving one or more entries associated with the virtual bucket from the first bucket to the second bucket; and means for inserting the entry into the second bucket.

Example 36 may include the apparatus of example 35, wherein moving one or more entries associated with the virtual bucket from the first bucket to the second bucket further includes: means for determining a number of entries to be moved; means for determining a counter of the first bucket by the number of entries to be moved; means for incrementing a counter of the second bucket by the number of entries to be moved plus 1.

Example 37 may include the apparatus of any one of examples 35-36, wherein selecting the first bucket further includes means for selecting the first bucket based upon entries in a mapping array.

Example 38 may include the apparatus of any one of examples 35-36, wherein the groups of buckets correspondingly associated with the plurality of virtual buckets are identified in a mapping array.

Example 39 may include the apparatus of example 38, wherein the mapping array is on a storage device.

Example 40 may include the apparatus of any one of examples 35-36, wherein a data packet includes a network packet address.

Example 41 may include the apparatus of any one of examples 35-36, wherein inserting the entry comprises means for managing a standard deviation of a plurality of counters of a respective plurality of buckets.

Example 42 may include the apparatus of any one of examples 35-36, wherein the plurality of buckets is a fixed number.

Example 43 may include the apparatus of any one of examples 35-36, wherein the number of entries in a bucket is limited to a fixed number.

Example 44 may include the apparatus of any one of examples 35-36, wherein inserting the entry is to be complete in O(1) operations.

Example 45 may include the apparatus of any one of examples 35-36, wherein inserting the entry comprises means for managing the number of entries respectively in the plurality of buckets.

What is claimed is:

1. An apparatus for computing, comprising:
one or more computer processors; a storage device coupled to the one or more computer processors; an insertion module communicatively coupled to the one or more processors, to manage insertion of entries into a hash table residing on the storage device, wherein the hash table has a plurality of buckets to hold a plurality of entries, the buckets divided into groups and the groups of buckets are correspondingly associated with a plurality of virtual buckets; and wherein the insertion module is to:
receive a data packet for insertion as an entry into the hash table; apply a hash function to the data packet to determine a virtual bucket associated with the entry; select a first bucket of the group of buckets associated with the virtual bucket; compare respective counters of the group of buckets, wherein the respective counters indicate a number of entries associated with each bucket of the group of buckets; determine, based on the comparison, a second bucket of the group of buckets having a lower counter value; move one or more entries associated with the virtual bucket from the first bucket to the second bucket to balance the number of entries across the group of buckets; and insert the entry into the second bucket.

2. The apparatus of claim 1, wherein the entry includes a key, a value, and a virtual bucket identifier.

3. The apparatus of claim 1, wherein move one or more entries associated with the virtual bucket from the first bucket to the second bucket further includes:
determine a number of entries to be moved;
decrement a counter of the first bucket by the number of entries to be moved;
increment a counter of the second bucket by the number of entries to be moved plus 1.

4. The apparatus of claim 1, wherein select the first bucket further includes selected the first bucket based upon entries in a mapping array.

5. The apparatus of claim 1, wherein the groups of buckets correspondingly associated with the plurality of virtual buckets are identified in a mapping array.

6. The apparatus of claim 5, wherein the mapping array is on the storage device.

7. The apparatus of claim 1, wherein the data packet includes a network packet address.

8. The apparatus of claim 1, wherein to insert the entry comprises to manage a standard deviation of a plurality of counters of a respective plurality of buckets.

9. The apparatus of claim 1, wherein the plurality of buckets is a fixed number.

10. The apparatus of claim 1, wherein the number of entries in a bucket is limited to a fixed number.

11. The apparatus of claim 1, wherein to insert the entry is to be complete in O(1) operations.

12. The apparatus of claim 1, wherein to insert the entry comprises to manage the number of entries respectively in the plurality of buckets.

13. A method for computing, comprising:
receiving, by a computing system, a data packet for insertion as an entry into a hash table having a plurality of buckets to hold a plurality of entries, the buckets divided into groups and the groups of buckets correspondingly associated with a plurality of virtual buckets;
applying, by the computing system, a hash function to the data packet to determine a virtual bucket associated with the entry;
selecting, by the computing system, a first bucket of a group of buckets associated with the virtual bucket;
comparing, by the computing system, respective counters of the group of buckets, wherein the respective counters indicate a number of entries associated with each bucket of the group of buckets;
determining, by the computing system, based on the comparison, a second bucket of the group of buckets having a lower counter value;
moving, by the computing system, one or more entries associated with the virtual bucket from the first bucket to the second bucket to balance the number of entries across the group of buckets; and
inserting, by the computing system, the entry into the second bucket.

14. The method of claim 13, wherein moving one or more entries associated with the virtual bucket from the first bucket to the second bucket further includes:
determining, by the computing system, a number of entries to be moved;
determining, by the computing system, a counter of the first bucket by the number of entries to be moved;
incrementing, by the computing system, a counter of the second bucket by the number of entries to be moved plus 1.

15. The method of claim 13, wherein selecting the first bucket further includes selecting the first bucket based upon entries in a mapping array.

16. The method of claim 13, wherein the groups of buckets correspondingly associated with the plurality of virtual buckets are identified in a mapping array.

17. The method of claim 16, wherein the mapping array is on a storage device.

18. The method of claim 13, wherein the data packet includes a network packet address.

19. The method of claim 13, wherein inserting the entry comprises managing, by the computing system, a standard deviation of a plurality of counters of a respective plurality of buckets.

20. The method of claim 13, wherein the plurality of buckets is a fixed number.

21. The method of claim 13, wherein the number of entries in a bucket is limited to a fixed number.

22. The method of claim 13, wherein inserting the entry is to be complete in O(1) operations.

23. The method of claim 13, wherein inserting the entry comprises managing, by the computing system, the number of entries respectively in the plurality of buckets.

24. One or more non-transitory computer-readable media comprising instructions that cause a computing device, in response to execution of the instructions by the computing device, to:
receive, by the computing device, a data packet for insertion as an entry into a hash table having a plurality of buckets to hold a plurality of entries, the buckets divided into groups and the groups of buckets correspondingly associated with a plurality of virtual buckets;

apply, by the computing device, a hash function to the data packet to determine a virtual bucket associated with the entry;

select, by the computing device, a first bucket of a group of buckets associated with the virtual bucket;

compare, by the computing device, respective counters of the group of buckets, wherein the respective counters indicate a number of entries associated with each bucket of the group of buckets;

determine, by the computing device, based on the comparison, a second bucket of the group of buckets having a lower counter value;

move, by the computing device, one or more entries associated with the virtual bucket from the first bucket to the second bucket to balance the number of entries across the group of buckets; and insert, by the computing device, the entry into the second bucket.

25. The one or more non-transitory computer-readable media of claim 24, wherein move one or more entries associated with the virtual bucket from the first bucket to the second bucket includes:

determine, by the computing device, a number of entries to be moved;

determine, by the computing device, a counter of the first bucket by the number of entries to be moved;

increment, by the computing device, a counter of the second bucket by the number of entries to be moved plus 1.

\* \* \* \* \*